(12) United States Patent
Gefflaut et al.

(10) Patent No.: US 8,369,343 B2
(45) Date of Patent: Feb. 5, 2013

(54) DEVICE VIRTUALIZATION

(75) Inventors: Alain Gefflaut, Aachen (DE); Ulrich Müller, Aachen (DE)

(73) Assignee: Microsoft Corporation, Redmond, WA (US)

( * ) Notice: Subject to any disclaimer, the term of this patent is extended or adjusted under 35 U.S.C. 154(b) by 1114 days.

(21) Appl. No.: 12/132,095

(22) Filed: Jun. 3, 2008

(65) Prior Publication Data

US 2009/0296718 A1    Dec. 3, 2009

(51) Int. Cl.
*H04L 12/28* (2006.01)
(52) U.S. Cl. .......... 370/395.53; 370/409; 709/232
(58) Field of Classification Search .......... 370/397, 370/395.53
See application file for complete search history.

(56) References Cited

U.S. PATENT DOCUMENTS

| | | | |
|---|---|---|---|
| 6,118,784 A * | 9/2000 | Tsuchiya et al. .......... 370/401 |
| 7,093,288 B1 | 8/2006 | Hydrie et al. |
| 7,124,189 B2 | 10/2006 | Summers et al. |
| 2002/0186698 A1* | 12/2002 | Ceniza .......... 370/401 |
| 2003/0046416 A1* | 3/2003 | Heuer .......... 709/232 |
| 2003/0140107 A1 | 7/2003 | Rezvani et al. |
| 2004/0186837 A1 | 9/2004 | Lambert et al. |
| 2006/0045089 A1 | 3/2006 | Bacher et al. |
| 2006/0168656 A1 | 7/2006 | Stirbu |
| 2006/0227780 A1* | 10/2006 | Inouchi et al. .......... 370/389 |
| 2007/0011733 A1 | 1/2007 | Gbadegesin et al. |
| 2007/0067775 A1* | 3/2007 | Shultz et al. .......... 718/102 |
| 2007/0118895 A1 | 5/2007 | Coskun et al. |
| 2007/0168458 A1 | 7/2007 | Costa-Requena et al. |
| 2007/0168481 A1 | 7/2007 | Lambert et al. |
| 2008/0008192 A1* | 1/2008 | Matoba .......... 370/397 |
| 2008/0059596 A1* | 3/2008 | Ogawa .......... 709/207 |
| 2008/0240083 A1* | 10/2008 | Feldman et al. .......... 370/352 |

OTHER PUBLICATIONS

Loshin, "Network Address Translation", retrieved on Feb. 28, 2008 <<http://www.computerworld.com/networkingtopics/networking/lanwan/story/0,10801,57780,00.html>>, Computerworld, Feb. 19, 2001, pp. 1-4.
Virtual Devices to Bridge or Extend Network Controllable Devices, Defensive Publication, filed Nov. 1, 2006, Publication No. IPCOM000142558DMS.
Virtual Private Networks, retrieved on Feb. 28, 2008 at <<http://www.cisco.com/univercd/cc/td/doc/cisintwk/ito_doc/vpn.pdf, pp. 18-1 to 18-4.

* cited by examiner

*Primary Examiner* — Dang Ton
*Assistant Examiner* — Pamit Kaur
(74) *Attorney, Agent, or Firm* — Zete Law, P.L.L.C.; MacLane C. Key (57) ABSTRACT

Methods and apparatus for device virtualization and for communication between network devices are described. In one example, all devices on a first Local Area Network (LAN1) which are to communicate with devices on a second Local Area Network (LAN2) have a virtual presence on LAN2, and all the devices on LAN2 which are to communicate with devices on LAN1 have a virtual presence on LAN1, enabling these devices to communicate as if they were located in the same LAN. In another example, a device which uses different networking protocols to other devices on a network is virtualized on its own network, along with all the devices with which it communicates. In either example, the proposed virtualization technique may ensure that virtualized devices appear like physical devices to the other devices such that no modifications of the networking protocol is necessary to interact with a virtualized device.

13 Claims, 7 Drawing Sheets

DEVICE VIRTUALIZATION

BACKGROUND

Local Area Networks (LANs) allow devices connected to a network to communicate with each other. For example, in a home environment, a LAN may allow a games console including a screen, for example a television, to play media from a media server by streaming packets of video data over the LAN. Each packet is sent to a destination device using an address which is local to that LAN.

The availability of multicast and broadcast within LANs enables a range of features which enhance and simplify a user's experience, for example allowing auto discovery of Universal Plug and Play (UPnP) devices and of Web Services Dynamic Discovery (WS-Discovery) enabled devices. Once devices have been discovered, they can send and receive packets over the LAN. These features are local to each LAN.

There are various technologies which enable remote access to a LAN, for example Virtual Private Networking (VPN), which allows a remote device to act as part of a LAN by providing the remote device with some client software which enables it to connect to the target LAN and be part of it as if the device was physically located in the LAN. As long as the remote device is able to be reprogrammed with the VPN client software, VPN can be used to extend the borders of the LAN.

The embodiments described below are not limited to implementations which solve any or all of the disadvantages of known device virtualization systems, or systems which link LANs.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods and apparatus for network device virtualization and for communication between network devices are described. In one example, all devices on a first Local Area Network (LAN1) which are to communicate with devices on a second Local Area Network (LAN2) have a virtual presence on LAN2, and all the devices on LAN2 which are to communicate with devices on LAN1 have a virtual presence on LAN1, enabling these devices to communicate as if they were located in the same LAN. In another example, a device which uses different networking protocols to other devices on a network is virtualized on its own network, along with all the devices with which it communicates. In either example, the proposed virtualization technique may ensure that virtualized devices appear like physical devices to the other devices such that no modifications of the networking protocol is necessary to interact with a virtualized device.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present examples may be constructed or utilized. The description sets forth the functions of the examples and the sequence of steps for constructing and operating the examples. However, the same or equivalent functions and sequences may be accomplished by different examples.

The term 'legacy device' as used herein means a device which cannot readily be upgraded, and in particular but not exclusively, cannot readily be reprogrammed with new client software. Many consumer electronic devices can be considered as legacy devices. The term 'network device' as used herein means a device which can (or does) form part of a LAN.

Figure 1:
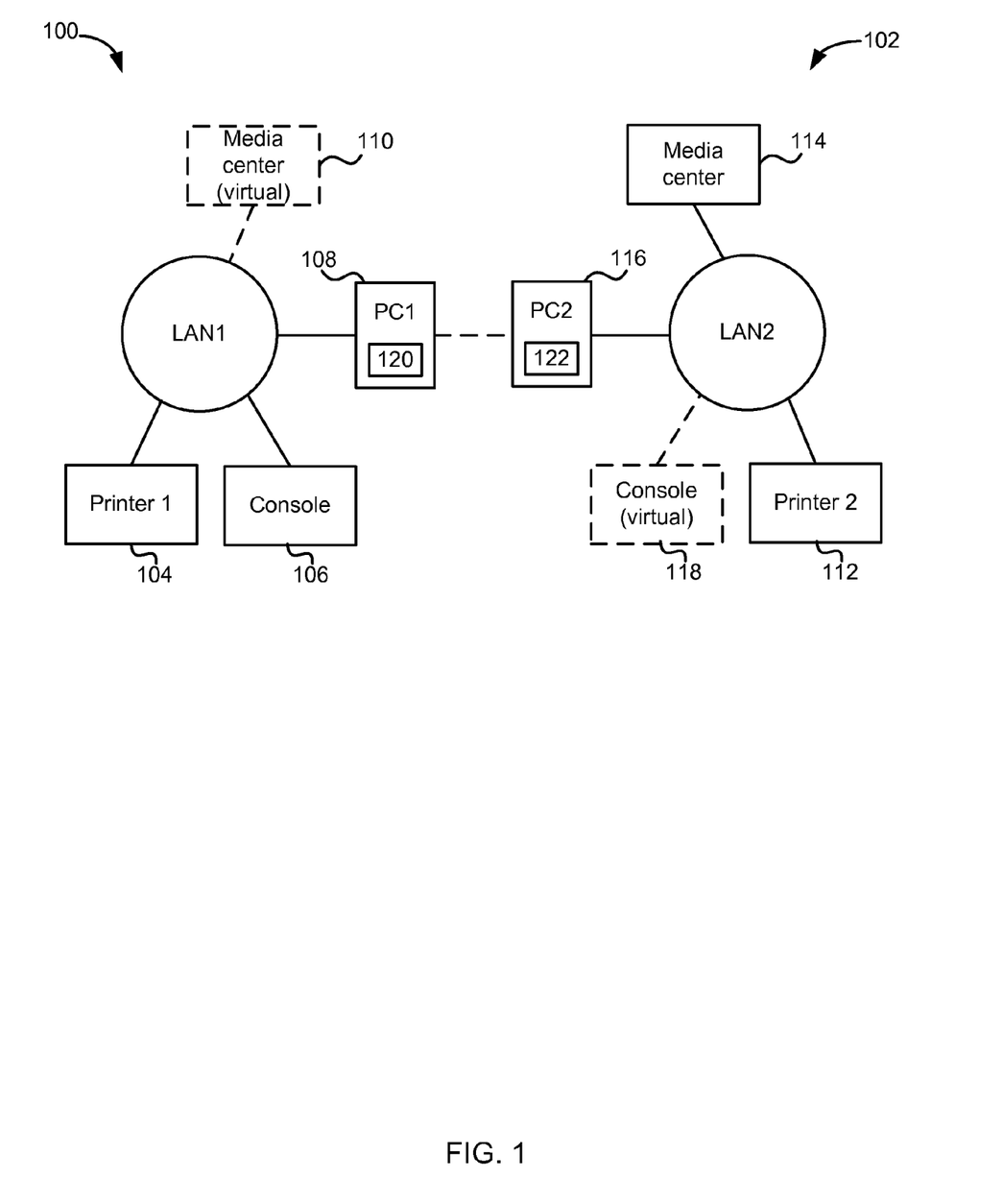
FIG. 1 is a schematic diagram of two linked Local Area Networks (LANs)

Local Area Networks (LANs) allow devices on the network to directly communicate with one another. FIG. 1 shows two example LANs, LAN1 100 and LAN2 102.

LAN1 100 comprises three physical network devices: a printer 104, a games console 106 (e.g. an Xbox) which includes a screen and a Personal Computer 108. In addition, LAN1 100 comprises a virtual network device comprising a virtual media center 110. This virtual media center 110 is not physically present on LAN1 100 and is instead a virtualization of a media center 114 physically located in LAN2 102. As will be explained in greater detail below, it appears to the other network LAN1 devices 104, 106 that the virtual media center 110 is physically present in LAN1 100.

LAN2 102 also comprises three physical network devices: a printer 112, a media center 114 and a Personal Computer 116. In addition, LAN2 102 comprises a virtual games console 118, which is a virtualization of the console 106 on LAN1 100. The computers 108, 116 both comprise a virtualization module 120, 122 which allows the virtualization of devices which are physically present on one LAN 100, 102 on the other LAN 100, 102.

Figure 2:
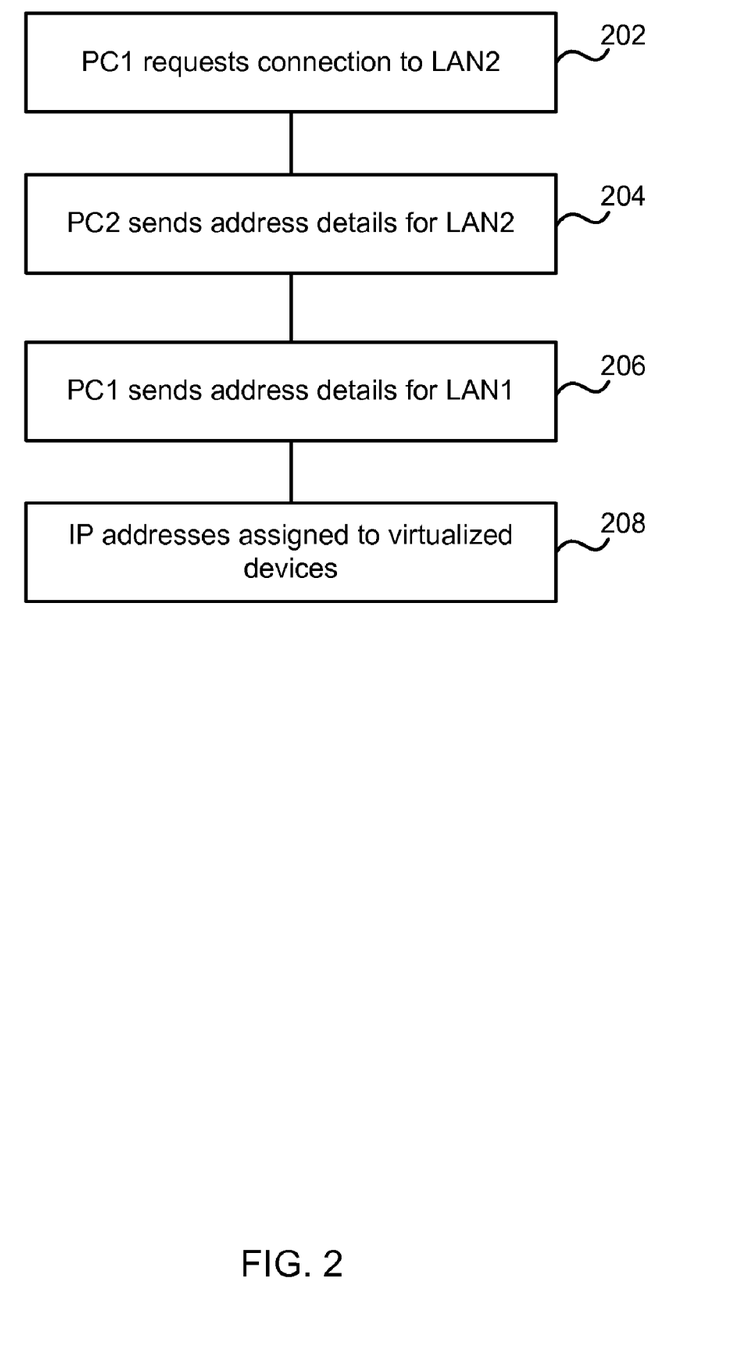
FIG. 2 is a flow diagram of the steps in setting up virtual devices in the networks of FIG. 1.

The process of connecting LAN1 100 to LAN2 102 is now described with reference to the flow diagram of FIG. 2.

First, the user of LAN1 controls his or her computer 108 to request a connection to LAN2 102 (block 202), for example over the Internet. The computer 116 of LAN2 102 responds with a list of the IP addresses of the network devices which the administrator of LAN2 102 has agreed should be virtualized, which in this example is the media center 114 (block 204). As in this example, this may not be all of the devices on LAN2 102 as, for reasons of security or privacy, the administrator of LAN2 102 may have partitioned LAN2 102 into devices that may be virtualized and those to which access from outside LAN2 102 should be prevented. This partitioning may, for example, be carried out on installation of the virtualization module 120, 122. This may comprise, for example, the virtualization module 120, 122 detecting network devices through broadcasted packets and requesting the administrator to select whether or not each device should be virtualizable. Alternatively, or in addition, the administrator could inform the virtualization module 120, 122 of the presence of some or all of the network devices and select whether each of these should be virtualized (or at least be virtualizable). This method allows devices which do not broadcast their presence (for example, some electronic picture frames may typically fall into this category) to become known to the virtualization module 120, 122.

The computer 108 of LAN1 100 responds with the addresses of the network devices which the administrator of LAN1 100 has determined should be virtualizable, in this example the console 106 (block 206). The addresses may include both data link layer addresses (e.g. Ethernet MAC address) and network layer addresses (e.g. IPv4 address). In this example, the data link layer is provided by an Ethernet network and the network layer address is an IPv4 address.

In this example, the MAC addresses and IP address of the network devices are exchanged. As is explained in greater detail below, each virtualization module 120, 122 assigns a MAC address for the virtualized device to be used within its network. There are various options for this. In one example, a virtualization module 120, 122 assigns the MAC address of the computer 108, 116 on which it is running, and thus packets sent to a virtual device are automatically received by that computer 108, 116. In order to ensure that the packets sent to a virtual device do not interfere with the networking stack of the on which computer 108, 116 the virtualization module 120, 122 is running, the virtualization modules 120, 122 filter network packets and are arranged to drop packets that are not to be received by the network stack of the computer 108, 116 on which that virtualization module 120, 122 is running.

In the example described below, the virtualization modules 120, 122 assign a MAC address to the virtual device it hosts. This address is unique within the LAN 100, 102. This may be the MAC address of the corresponding physical device, or another unique virtual MAC address. As will be familiar to the skilled person, physical MAC addresses are unique to each device and are assigned by the manufacturer of the network interface. By choosing the MAC address of the physical device, other network devices within the LAN cannot determine from the packets whether the device in the network 100, 102 is being virtualized or physically present. In order to receive packets sent to a MAC address other than its own, the virtualization module 120, 122 may configure the network interface of the host computer 108, 116 appropriately in order to enable it to receive network traffic for multiple MAC addresses. This can be done for example by setting the network card into promiscuous mode, in which the card will not filter out packets with a destination address different than it own address.

The IP address for each device is assigned locally within each network. Following the exchange of information, the virtualized devices are assigned virtual IP addresses by the virtualization modules 120, 122 on the network on which they are virtualized (block 208). This is done in compliance with the local network configuration, e.g. through the usage of DHCP or by manually assigning IP addresses through, for example, the network administrator. In this example, the IP addresses are:

| LAN1 | |
|---|---|
| Console | 192.168.1.10 (Physical IP address) |
| Virtual media center | 192.168.1.12 (virtual IP address) |
| LAN2 | |
| Media center | 192.168.2.21 (Physical IP address) |
| Virtual console | 192.168.2.24 (Virtual IP address) |

Figure 3:
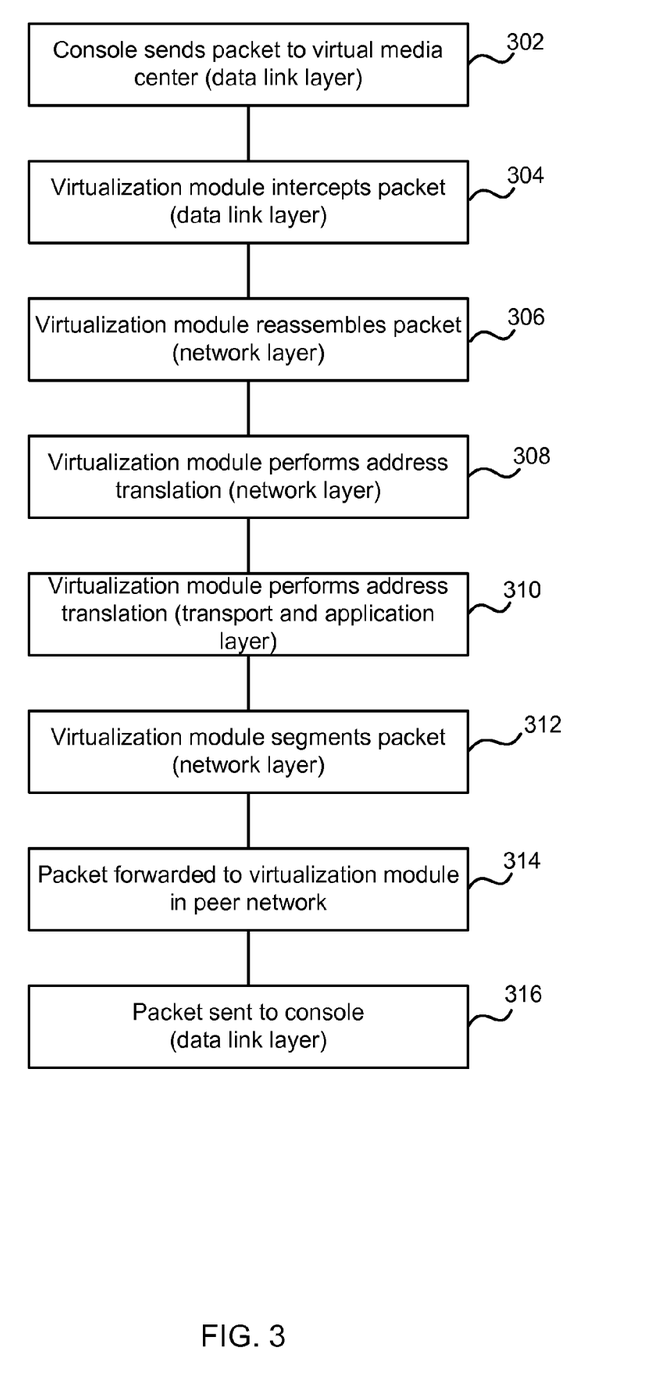
FIG. 3 is a flow diagram of the steps in sending data between the networks of FIG. 1.

In this example, a user wishes to play media available on the media center 114 of LAN2 102 on his or her console 106 on LAN 1. The process of data transmission is now described with reference to the flow diagram of FIG. 3. In FIG. 3, the expression 'peer network' is used to refer to an associated network (i.e. LAN1 is a peer network of LAN2 and vice versa). The console 106 sends a data packet addressed to the IP address assigned to the virtual media center 110 by the virtualization module 120, 192.168.1.12 (block 302). In this example, the data packet is fragmented by the console 106.

As previously described, the virtualization module 120 of the computer 108 on LAN1 100 is listening for all packets sent to the virtualized device 110 and intercepts the packet (block 304). As the data packet in this example has been fragmented, the virtualization module 120 may perform a reassembly of IP packets (block 306) before processing them further. However, it will be appreciated that in other examples, the data packet may not be fragmented and therefore reassembly will not be required.

Once the virtualization module 120 of LAN1 has intercepted the IP packet, it performs a source and destination network address translation, changing the virtual destination IP address of the packet to the physical IP address of the actual media center 114 (i.e. 192.168.1.12 is replaced with 192.168.2.21) and also changing the physical source address from that of the actual console 106 to that of the virtual console 118 (i.e. 192.162.1.10 is replaced with 192.168.2.24) (block 308). The IP header checksum is recomputed to reflect these changes.

Depending on the application protocol in use, the virtualization module 120 may also inspect and change the payload of the packets to perform an address translation in the transport and application layers (block 310). For example, application protocols such as File Transfer Protocol (FTP) or Universal Plug and Play (UPnP) embed the IP address of the target devices inside the payload and so the payload will need to be modified when changing the virtual IP address to the physical address of the device.

In this example, in order to update the packet, the virtualization module 120 inspects the payload of the packet. For example, if the IP header of the packet has been changed, the virtualization module 120 may update the header checksum of UDP and TCP packets.

In this example, the resulting IP packet exceeds the maximum allowed size of the remote LAN2 102, and the virtualization module 120 therefore performs an IP fragmentation (block 312). However, this may not be necessary in other examples. The packet is then forwarded, for example over the Internet, to the computer 112 on LAN2 102 (block 314).

The computer 116 on LAN2 102 receives the packet. Depending on the MAC address being used locally for the virtual console 118 (i.e. whether it is different from the MAC address of the actual console 106), its virtualization module 112 may update the MAC address of the packet source to the address being used for the virtual console 118. Finally, it forwards the packet over LAN2 102 to the media center 114 (block 316).

As the source IP address of the received packet has been replaced, it appears to the media center 114 that the data packet has come from a device on its own network, specifically the virtual console 118. The media center 114 therefore responds by sending packets addressed to the virtual console 118. These data packets are intercepted by the virtualization module 122 on LAN2 102 in the manner described above, and the source and destination IP addresses are translated. The data packet is then forwarded to LAN1 and the translated destination IP address is used to send the data on to the console 106.

Some variations to this example which are within the scope of this disclosure may be readily apparent to the skilled person. For example, in the above example, the IP address translation is carried out by the computer 108, 116 on the network in which the data packet has been sent, whereas in other examples either computer 108, 116 could carry out all address translations. In some examples, the networks 100, 102 may have a common computer, for example a server computer, connected to both networks 100, 102 and which performs the translations. The addresses assigned depend on the data packet sent and the application protocols applied. If the LAN uses IPv4, the addresses are unique in the peer network (i.e. LAN1 100 or LAN2 102). Addresses may be assigned statically or dynamically through DHCP (Dynamic Host Control Protocol). Since one address is required for every device of the remote LAN which potentially communicates with a local network device, there may be a significant demand for address allocation. This may be kept to a minimum by limiting the number of devices which are virtualized (e.g. in the above example, there is no need for the printers 104, 112 to communicate, so these are not virtualized). Alternatively (or additionally) DHCP addresses may be actively released by the local virtualization module 120, 122 when a device to which the address has been assigned is silent for a predetermined period.

In some examples, IPv6 may be used within a LAN and IPv6 link local addresses may be used. IPv6 link local addresses may be assigned in several ways and are unique within a LAN. However an address is generated, the probability of having the same address in two separate LANs is low due to the large IPv6 address space. Thus, and in contrast with IPV4 addresses, an IPv6 link local address may not need to be translated when forwarded from one network to another and instead the same IP address can be used in both networks, i.e. the virtualized device can have the same link local IP address as the actual device. However, in this example, address translation is still required in the unlikely case of address duplication between LANs. Therefore, an assessment is carried out to check that an assigned IPv6 address is not in user by another device on the network. If the address is not in use, then no address translation is performed. If the address is in use, then address translation is performed.

A second example is now described with reference to the network shown in FIG. 4. In this example, a single network using a first communication protocol (IPv6) includes a legacy device using a different communication protocol (IPv4).

Figure 4:
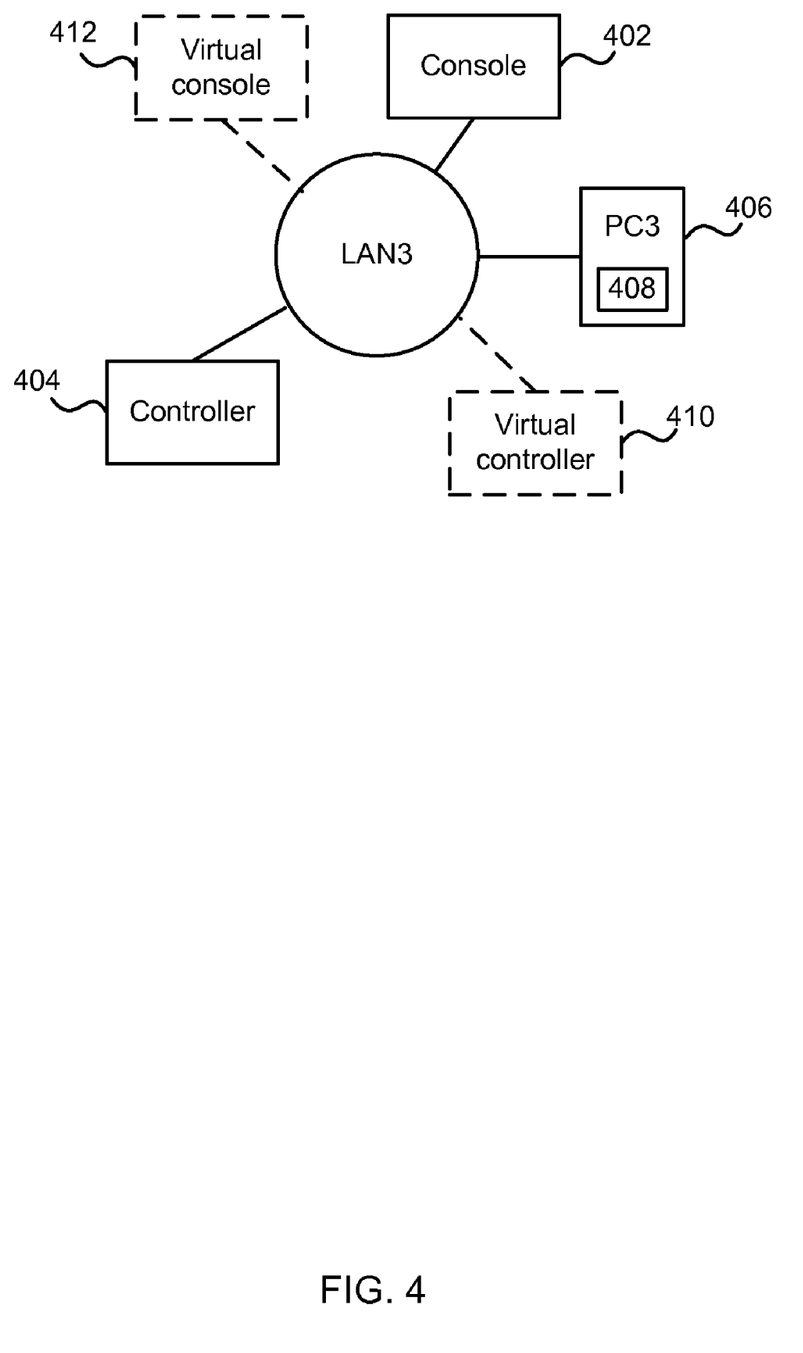
FIG. 4 is a schematic diagram of a network with IPv4 and IPv6 network devices.

FIG. 4 shows a LAN, LAN3, comprising a console 402, a controller 404 for the console and a computer 406. In this example, LAN3 is set up to communicate using IPv6. However, the controller 404 is an IPv4 device. As will be familiar to the skilled person, IPv6 is an Internet Protocol which supersedes IPv4, providing a longer address which allows greater flexibility in assigning addresses and reduces the risk of address exhaustion. Although IPv6 is expected to replace IPv4 over time, there are still many devices which utilize IPv4. Unless these devices are upgraded (or where upgrading is difficult or unfeasible, e.g. for legacy devices), mechanisms for translating packets addresses using IPv4 and IPv6 are needed if IPv4 devices are to communicate with IPv6 networks.

The computer 406 comprises a virtualization module 408. On initiation, the virtualization module 408 discovers (or, as noted above, is informed of) all the local network devices. A user indicates that the controller 404 is to communicate with the console 402 and the virtualization module 408 then follows the procedure now described with reference to the flow diagram of FIG. 5.

Figure 5:
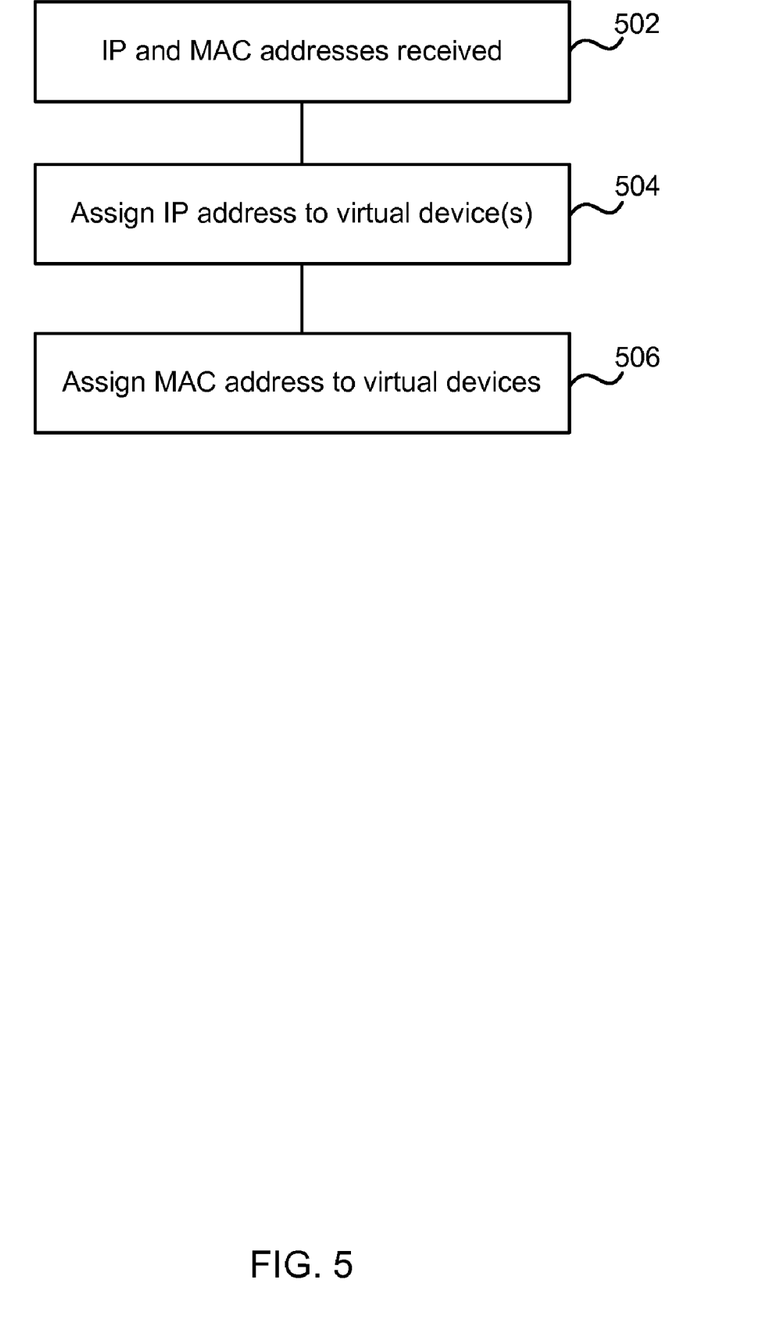
FIG. 5 is a flow diagram of the steps in setting up virtual devices in the network of FIG. 4.

The virtualization module 408 receives the MAC and IP addresses of the controller 404 and the console 402 (block 502). The virtualization module 408 is capable of reading both IPv4 and IPv6 data packets using techniques familiar to the skilled person. The virtualization module 408 assigns a virtual IPv6 address to a virtual controller 410 and a virtual IPv4 address to a virtual console 412 (block 504). In this example, the MAC address for the virtual devices is different from the MAC address of the actual devices in order to prevent confusion when redirecting the packets (as they are now forwarded in the same network as the network of the originating device). The virtualization module 408 therefore assigns virtual MAC addresses. In this example, the virtualization module 408 has an Organizationally Unique Identity (OUI) MAC address range for virtual network devices, and maps a real MAC address to a virtual address (block 506).

Figure 6:
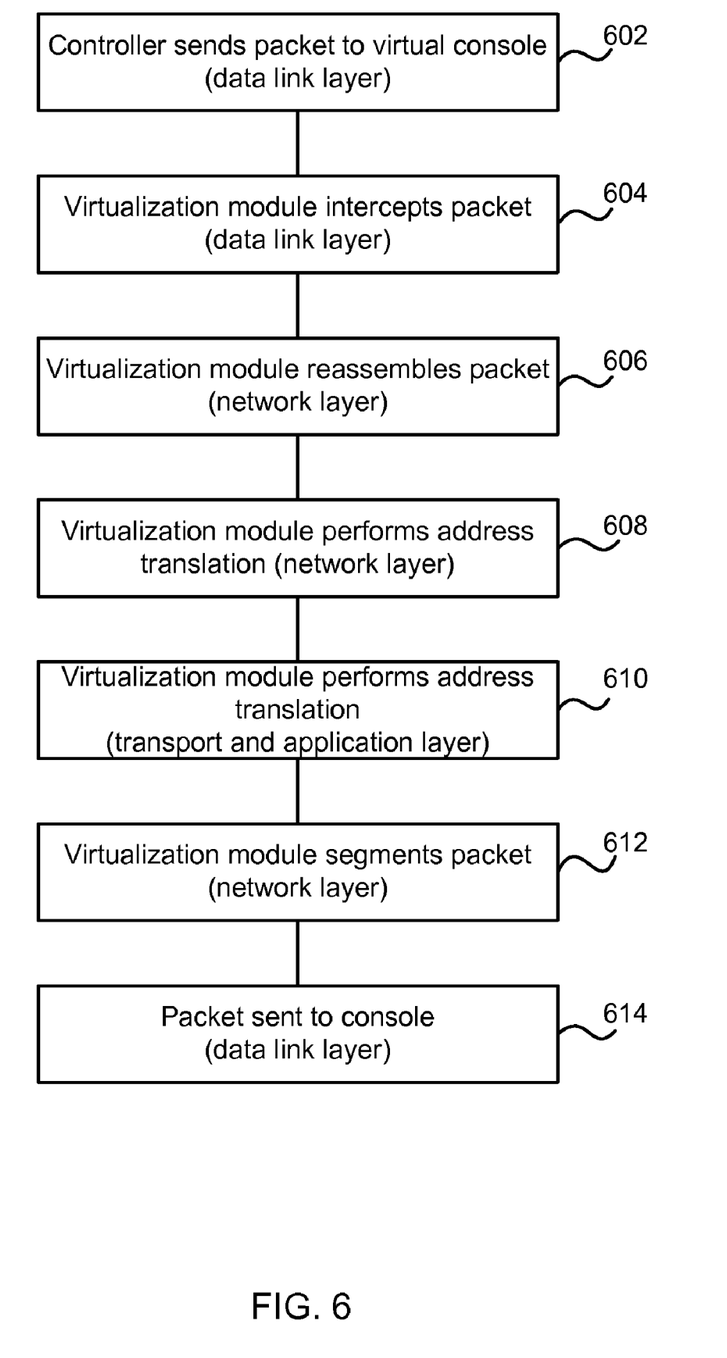
FIG. 6 is a flow diagram of the steps in sending data between the devices of the network of FIG. 4.

Data transfer within LAN3 is now described with reference to the flow diagram of FIG. 6.

The controller 404 sends a fragmented data packet to the console 402, addressing the message using the assigned IPv4 and MAC addresses to the virtual console 412 (block 602). This message is intercepted by the virtualization module 408 (block 604), which, in this example, is in a promiscuous mode and is therefore able to act as a proxy device.

In this example, the virtualization module 408 reassembles the packet (block 606). However, in other examples, the packet may not be fragmented so reassembly may not be required. The virtualization module 408 translates the packet from IPv4 to IPv6, replacing the IP and MAC address on the packet to the IPv6 address and the MAC address of the actual console 402 (block 608). This includes changing the IP header from an IPv4 header to an IPv6 header. Depending on the application protocol in use, the virtualization module 408 may also inspect and change the payload of the packets to perform an address translation in the transport and application layers (block 610). The packet is fragmented (block 612) and forwarded to the actual console 402 (block 614). As will be appreciated by the skilled person, in other examples, the packet may not be fragmented before it is sent to the console 402.

Equally, data sent from the console 402 will be addressed to the IPv6 IP address and the assigned MAC address of the virtual console 412 and will be intercepted and translated to the IPv4 and MAC address of the physical controller 404.

As will be appreciated, variations may be made to these examples which are within the scope of this disclosure. As mentioned above some application protocols embed an IP address in their payload, for example, File Transfer Protocol (FTP), Hypertext Transfer Protocol (HTTP) or Universal Plug and Play (UPnP). In such examples, the virtualization module will read the payload to extract and translate the addresses. There are techniques which will be familiar to the skilled person for achieving this.

Once a network device has been virtualized, there are a number of ways in which access to that device can be restricted to create partitioning. For example, unicast packets sent from an actual device can be filtered to certain destinations by the computer 108, 116 used for the virtualization. Broadcast packets sent from a device can be translated into data link layer unicast in order to limit the number of devices which will receive the packet. Alternatively or additionally, packets sent to a virtual device can be filtered by the sender. Although a local device appears to be present in a remote LAN through virtualization, it is possible to limit the set of devices which can communicate with a virtual device and thus create network portions, potentially independently for each virtual device. This can limit unwanted traffic on the LAN(s), which may not be possible if the LANs are simply connected by a cable or the like (this is termed "bridging the LANs" in the art).

From the above disclosure, it will be noted that there are no issues with address range conflicts when virtualizing a device on a different LAN, e.g. it does not matter if the devices in one LAN use the same IPv4 address range as the devices in the other LAN.

In addition, the above described examples are able to adapt to dynamic changes in network topology (i.e. as network devices are added/removed).

It is also possible to create a virtual network comprising, for example, the personal network devices of a single user. To some extent, this is already possible using Peer-to-Peer (P2P) VPN, but this solution is limited in its ability to include devices which cannot run custom software (e.g. legacy devices, remote servers, $3^{rd}$ party devices) and will not allow interaction between the devices of different users. A LAN as described above could be provided by a P2P-VPN network.

In some examples, virtual devices on one LAN may be virtualized on two or more further LANs. For example, if three LANs (LAN, LAN2 and LAN3) are provided, virtualization can be performed between networks LAN1 and LAN2, and between networks LAN2 and LAN3 simultaneously. In addition, a device that is a virtual device in one network (e.g. a physical device in LAN1 being virtualized in LAN2) can be virtualized again into another network, (e.g. the virtual device in LAN2 being re-virtualized in LAN3), providing multiple layers of virtualization. There may of course be more than three networks in such examples.

Figure 7:
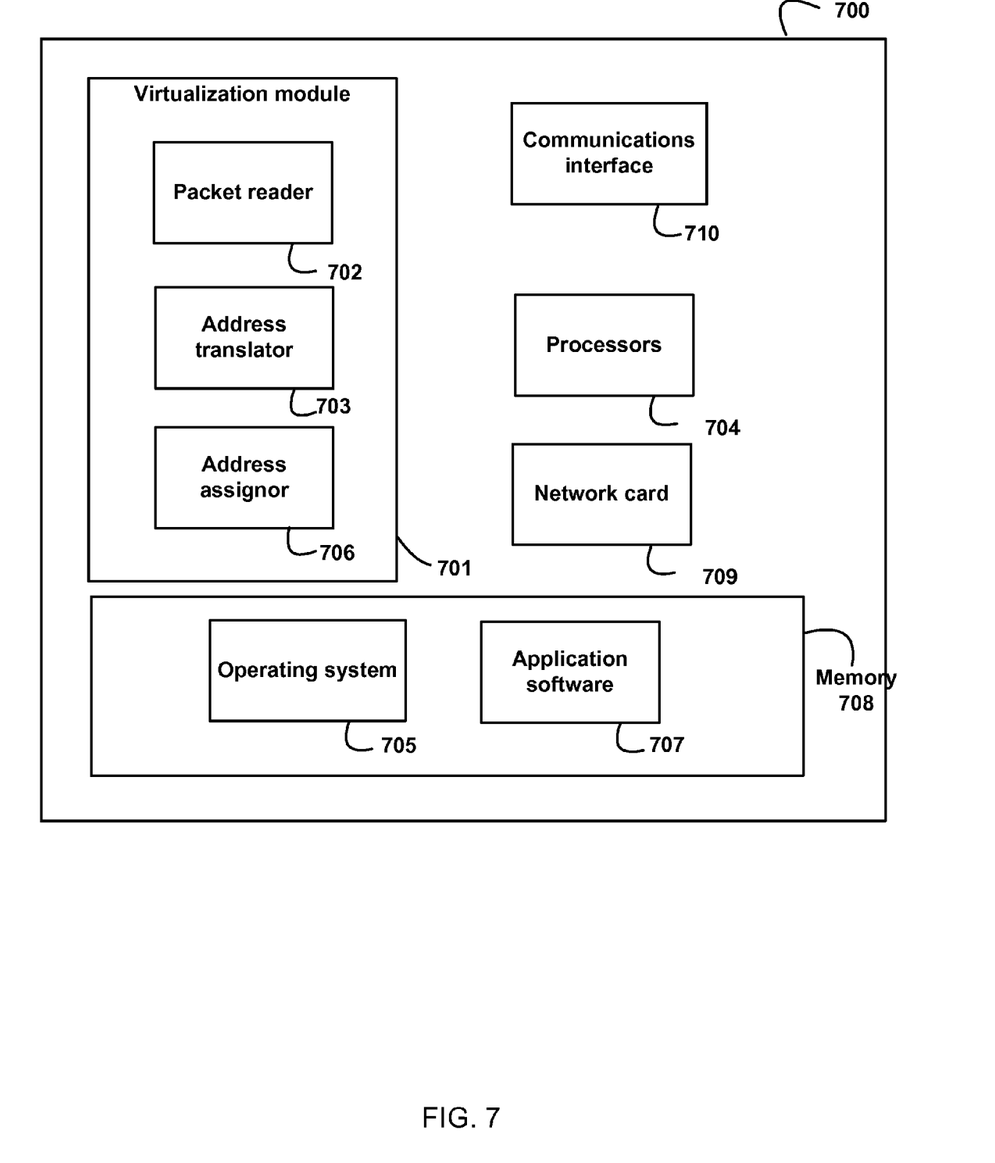
FIG. 7 illustrates an exemplary computing-based device in which embodiments of network devices may be implemented.

FIG. 7 illustrates various components of an exemplary computing-based device 700 which may be implemented as any form of a computing and/or electronic device, and in which embodiments of the methods described above may be implemented. In particular, the computing-based device 700 may comprise another example of a computer 108, 116, 406 comprising a virtualization module 120, 122, 408.

Computing-based device 700 comprises a virtualization module 701, which comprises a packet reader 702, an address translator 703 and an address assignor 706 capable of assigning an address to a virtual device. The computing-based device 700 may further comprise a configurable network card 709.

The computing-based device 700 also comprises one or more processors 704 which may be microprocessors, controllers or any other suitable type of processors for processing computing executable instructions to control the operation of the device in order to capture data. Platform software comprising an operating system 705 or any other suitable platform software may be provided at the computing-based device to enable application software to be executed on the device. The application software may comprise a client application 707 comprising executable instructions arranged to cause the device to receive data packets, perform address translations and forward data packets.

The computer executable instructions may be provided using any computer-readable media, such as memory 708. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

The computing-based device 700 may further comprise a communication interface 710 for sending and receiving data.

The computing-based device 700 may also comprise one or more inputs which are of any suitable type for receiving media content, Internet protocol (IP) input etc and one or more outputs, e.g. for providing an audio and/or video output to a display system integral with or in communication with the computing-based device or providing control signals for controlling a console in communication therewith. The display system may provide a graphical user interface, or other user interface of any suitable type.

Although the present examples are described and illustrated herein as being implemented in IPv4 and IPv6 based systems, the systems described are provided as an example and not a limitation. As those skilled in the art will appreciate, the present examples are suitable for application in a variety of different types of computing systems.

The FIGs showing apparatus comprise functional elements which may be combined in any way. Furthermore the devices may comprise additional elements not shown in the FIGs. In some examples, different apparatus may perform the method blocks or the method may be performed in a distributed manner across a number of devices.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminable computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that sole any or all of the stated problems or those that have any or all of the stated benefits and advantages. It will further be understood that reference to 'an' item refers to one or more of those items. Although the embodiment disclosed in FIG. 1 has two LANs, there may be more LANs in other examples.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of virtualizing network devices comprising:
   determining a plurality of network devices configured for network communication, wherein at least a first network device is physically located on a first local area network (LAN) and at least a second network device is physically located on a second LAN;
   partitioning the network by determining that the first network device and the second network device can each be virtualized to communicate with an identified subset of the plurality of network devices, while other network devices of the plurality of network devices cannot be virtualized;
   virtualizing the first network device on the second LAN and virtualizing the second network device on the first LAN by respectively assigning a virtual internet protocol (IP) address to a virtual first network device and a virtual second network device;
   determining that a data packet from the second network device is addressed to the virtual first network device;
   translating the virtual IP address associated with the virtual first network device to an IP address of the first network device; and
   translating an IP address associated with the second network device to the virtual IP address associated with the virtual second network device.

2. The method according to claim 1, wherein the first network device and the second network device operate using different communication protocols on the first LAN and the second LAN, respectively.

3. The method according to claim 2, wherein the first network device is an IPv4 device and the second network device is an IPv6 device.

4. The method according to claim 1, further comprising:
   assigning a virtual media access control (MAC) address to each of the first network device and the second network device, and
   translating the virtual MAC addresses for the first network device and the second network device to a physical MAC address of the first network device and a physical MAC address of the second network device.

5. The method according to claim 1, wherein at least one of the first network device and the second network device is a legacy device.

6. The method according to claim 1, further comprising forwarding the re-addressed data packet.

7. A computing device comprising:
   a virtualization module arranged to partition a first local access network (LAN) by determining that some but not all of a plurality of physical network devices on the first LAN are permitted to communicate with a virtual device located on the first LAN, wherein the virtual device corresponds to a physical network device located on a second LAN; and
   a communications interface arranged to allow the virtualization module to receive data packets from the some of the plurality of physical network devices, wherein the virtualization module includes:
      an address assignor arranged to assign the virtual device with a virtual internet protocol (IP) address on the first LAN;
      a packet reader arranged to read the data packets received by the communications interface and to determine if the data packets are addressed to the virtual device; and
      an address translator arranged to translate the virtual IP address to a physical device address associated with the physical network device located on the second network LAN.

8. The computing device according to claim 7, wherein the address assignor is further arranged to assign the virtual device with a media access control (MAC) address and the address translator is arranged to translate virtual device internet protocol (IP) and MAC addresses to the addresses of the virtual device.

9. The computing device according to claim 7, further comprising a configurable network card which can be configured to intercept data packets sent to predetermined network addresses.

10. The computing device according to claim 7 which is further arranged to forward the re-addressed data packet.

11. One or more computer memories storing device executable instructions for performing operations comprising:
   partitioning a plurality of physical network devices on a first local access network (LAN) into a first group of physical network devices that can be virtualized on a second LAN and a second group of physical network devices that cannot be virtualized on the second LAN;

extracting source and destination addresses from a data packet;

determining that one of the source address or the destination address corresponds to an address of a virtual network device on the second LAN, the virtual network device being associated with one of the first group of physical network devices;

determining that the other of the source address or the destination address corresponds to an address of a physical network device on the second LAN;

replacing the address of the virtual network device on the second LAN with an address of the one of the first group of physical network devices on the first LAN; and replacing the address of the physical network device on the second LAN with an address of an associated virtual network device on the first LAN.

12. One or more computer memories storing device executable instructions for performing operations according to claim 11, further comprising forwarding the data packet to an appropriate address.

13. One or more computer memories storing device executable instructions for performing operations according to claim 11, further comprising forwarding the data packet to a computing device arranged to forward the data packet to an appropriate address.

* * * * *